United States Patent [19]

Ariizumi et al.

[11] Patent Number: 4,840,347
[45] Date of Patent: Jun. 20, 1989

[54] PNEUMATICALLY-OPERATED VALVE

[75] Inventors: Ryozo Ariizumi; Masakuni Kainuma; Toshikazu Aoki; Shoji Suda; Mitsunori Hoshi, all of Saitama; Takashi Ejiri, Tokyo, all of Japan

[73] Assignee: Fujikura Rubber, Ltd., Tokyo, Japan

[21] Appl. No.: 168,092

[22] Filed: Mar. 14, 1988

[51] Int. Cl.⁴ .......................................... F16K 31/122
[52] U.S. Cl. .................................... 251/63.4; 251/63.6
[58] Field of Search ................ 251/63.4, 335.2, 63.6, 251/62; 92/151

[56] References Cited

U.S. PATENT DOCUMENTS

| | | | |
|---|---|---|---|
| 2,675,204 | 4/1954 | Johnson | 251/335.2 X |
| 3,180,235 | 4/1965 | Schmitz | 92/151 X |
| 3,485,141 | 12/1969 | Ott | 92/151 X |
| 3,698,688 | 10/1972 | Kutz | 251/335.2 X |
| 3,979,105 | 9/1976 | Pool | 251/335.2 X |
| 4,182,369 | 1/1980 | Akkerman | 251/63.4 X |
| 4,237,920 | 12/1980 | Norsian | 251/63.4 |
| 4,596,267 | 6/1986 | Tosseghini | 92/151 X |

Primary Examiner—Alan Cohan
Attorney, Agent, or Firm—Schwartz & Weinrieb

[57] ABSTRACT

A pneumatically-operated valve in which a valve actuator is formed of two separate parts: a driving member having a plurality of sealed pistons fixed to a piston rod in series to be operated by air pressure, and a valve operating member which comes into contact with a clean fluid and which does not have any soft substances such as O-rings which are likely to be impaired by ultrasonic cleaning. The valve facilitates the cleaning of the members during the process of manufacture and furthermore can provide a great deal of output for its size without contaminating the clean fluid during use.

11 Claims, 3 Drawing Sheets

F I G. 3
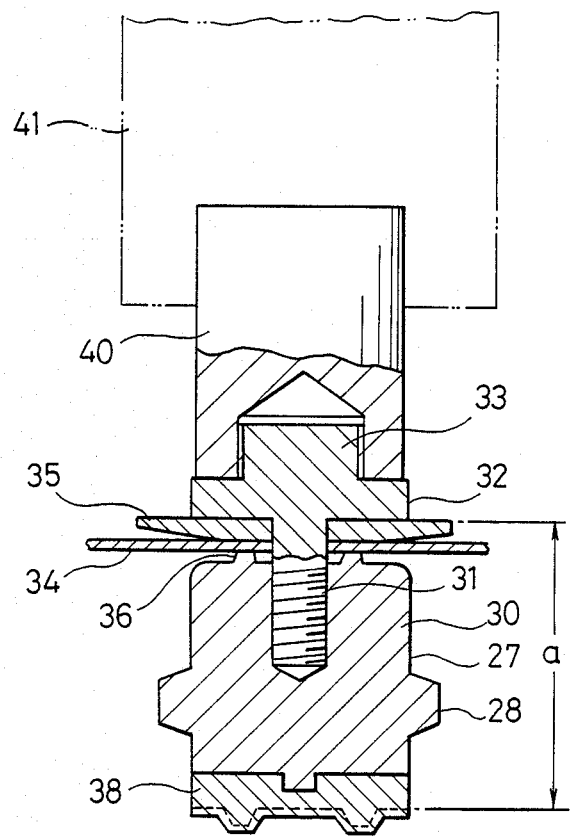

PNEUMATICALLY-OPERATED VALVE

FIELD OF THE INVENTION

The present invention relates to a pneumatically-operated valve, which is operated by the use of air so as to control the supply of a clean fluid to equipment for various purposes, which is adapted to facilitate the cleaning of members during the process of manufacture so as to maintain the clean fluid free from contamination during use, to obtain a large output for its small size, and to precisely transmit the movement of a piston rod by means of such output to a valve section.

BACKGROUND OF THE INVENTION

Conventional pneumatically-operated valves have been available in two types: a normally-open pneumatically-operated valve wherein a fluid passage is constantly kept open by means of a valve section provided upon a piston rod by means of a spring force being applied in one fixed direction, and is closed from the normally open state by applying the pneumatic pressure to the piston against the spring force when a valve closing signal is sensed; and a normally-closed pneumatically-operated valve wherein, normally, a fluid passage is constantly closed by means of a valve section provided upon a piston rod by means of a spring force; and is opened from the normally-closed state by applying the pneumatic pressure to the piston against the spring force when a valve opening signal is sensed.

In connection with the conventional valves, the only methods to obtain a large output in order to open or close the valve section were to increase the pneumatic pressure to be applied to the piston and to increase the piston diameter in order to provide a larger active pressure area. In the former method, however, the strength of the equipment which is subjected to the pneumatic pressure is limited; in small-sized equipment, for example high-pressure air is unusable. On the other hand, in the latter method increasing the piston diameter in order to provide a larger active pressure area is also not suitable for use for small-sized equipment because then the equipment no longer remains small in size.

When pure water as is used in cleaning IC substrates is adopted as the fluid the flow of which is controlled by means of the pneumatically-operated valve, it is essential to properly clean members before assembly in order to prevent the entrance of dust. However, since the valve uses a number of soft elastic members such as O-rings, powerfully cleaning them with ultrasonic waves will produce an undesirable result, such as, for example impairment of these soft elastic members. Furthermore, separately cleaning the soft elastic members such as the O-rings has the drawback that, because of the necessity of installation of the O-rings, the members will frequently come into contact with the O-rings during the assembling operation, resulting in the attachment of dust thereto.

To eliminate these drawbacks, there have been adopted such methods known in the prior art, as disclosed in Laid-Open Japanese Patents No. Sho 61-109973 and No. Sho 61-130682, wherein a valve actuator is formed of two separated parts: a driving member and a valve operating member, and soft substances such as O-rings, which are likely to be impaired by means of ultrasonic cleaning are attached only within the former, and are not used within the latter so as not to be in contact with the clean fluid, so that the valve operating member which comes into contact with a clean solution contained within the fluid passage will be thoroughly cleaned by cleaning the driving member and the valve operating member separately at the time of manufacture and thereafter the driving member and the valve operating member are assembled and connected together. However, where there is the necessity of decreasing the opening-closing stroke of the valve section, for example where there is available the opening-closing stroke of only about 0.6 mm, if the driving member and the valve operating member are assembled into one piston rod, thereby connecting the piston, lock ring, each connecting member, and many members at butting positions between the members, the manufacturing dimensional errors of these members, if slight within each member, will become great when totaled, and moreover when error and play that might occur in assembling the members are added, it will be likely that the opening-closing stroke of approximately 0.6 mm will be absorbed, resulting in a failure in the successful valving action.

SUMMARY OF THE INVENTION

The present invention relates to a pneumatically-operated valve which overcomes the above-described drawbacks, and has as one object to enable the provision of a high-output pneumatically-operated valve having pistons of a small diameter and moreover using a relatively low pneumatic operating pressure. It is another object to provide a valve opening and closing member which is formed of two-separate parts: a driving member and a valve operating member, and wherein soft substances such as O-rings which are likely to be impaired by ultrasonic cleaning are attached only within the former, but are not used within the latter so as not to be in contact with the clean fluid. The driving member and the valve operating member, therefore, are separately washed during manufacture, thereby enabling the thorough washing of the valve operating member which comes in contact with the clean fluid without contaminating the clean cleaning solution, without assembling and connecting the driving member and the valve operating member together, that is, leaving such members in a separated state, whereby the opening-closing stroke which is otherwise likely to be absorbed by the assembly and connection of the valve operating member and the driving member together, is not in fact absorbed, and furthermore a successful valving action with a small valve stroke is able to be achieved.

BRIEF DESCRIPTION OF THE DRAWINGS

Many other features and advantages of the present invention will become manifest upon making reference to the detailed description which follows and the accompanying drawings, wherein:

FIG. 3 is a sectional view showing a valve section of the present invention being cut on a machine tool.

DESCRIPTION OF PREFERRED EMBODIMENTS

Figure 1:
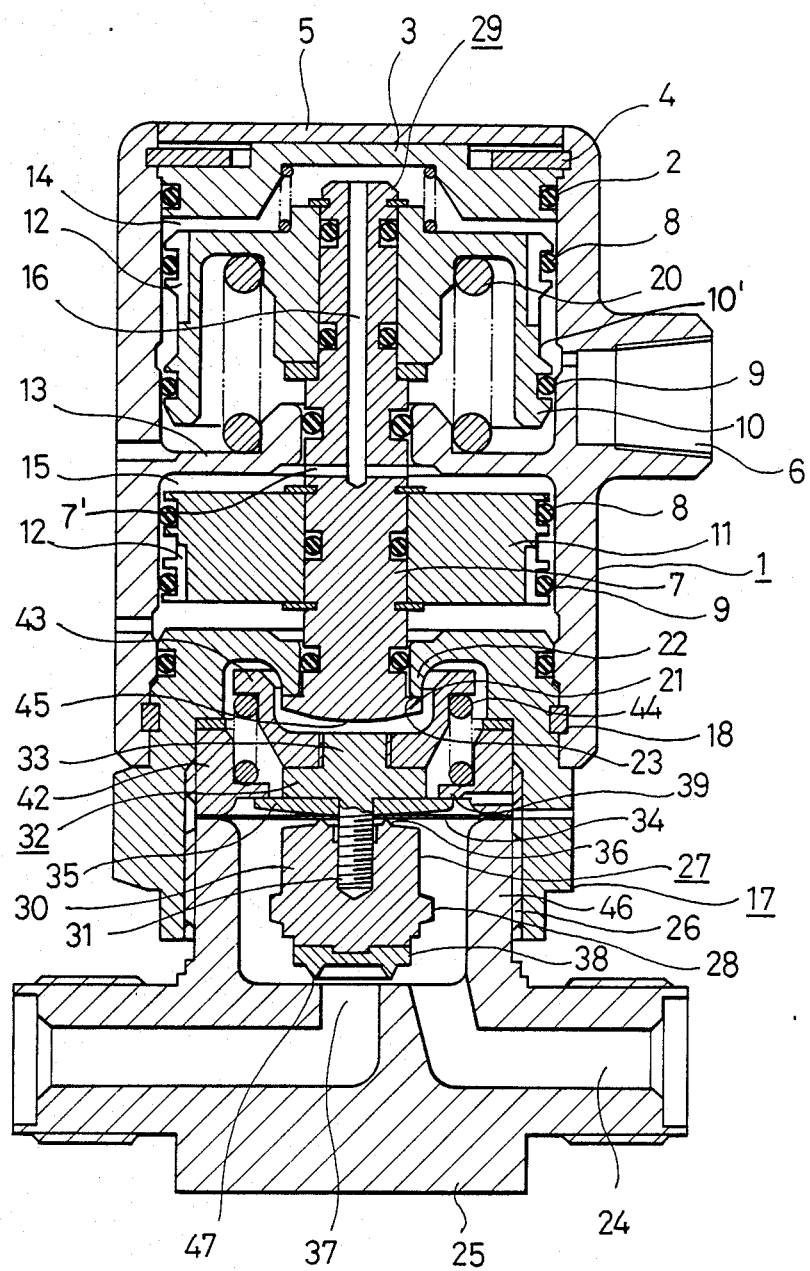
FIG. 1 is a sectional view of a normally-open pneumatically-operated valve constructed in accordance with the present invention.

To solve the above-described problems, the present invention provides a pneumatically-operated valve wherein a fluid passage is normally opened or closed by means of a valve section disposed upon a valve actuator by means of a biasing force of a spring acting in a fixed direction. Also the valve regularly switches the fluid passage from a normally-open state to a closed state or from a normally-closed state to an open state by sensing an OPEN/CLOSE signal and applying pneumatic pressure to a piston against the aforenoted biasing force. A plurality of pistons which slide in contact with the inner wall of a cylinder are mounted upon the outer periphery of a piston rod. These pistons are separately disposed within respective piston chambers in an airtight manner by means of an intervening separating wall and an inflow air chamber is formed upon one side of each piston. To this inflow air chamber an air inlet port which is open to the interior of the cylinder is connected. The valve actuator comprises a driving member disposed upon the pneumatic-pressure introducing side and a valve operating member disposed upon the fluid passage side. To this driving member, a biasing force of the above-mentioned spring is applied, while, to the valve operating member, a spring force directed toward the driving member side is also applied. The valve section described above is also disposed upon the passage side.

Since the present invention is constituted as described above, the inflow of air into the plurality of inflow air chambers from the air inlet which is open to the interior of the cylinder exerts pneumatic pressure upon the plurality of pistons; the pressure area acting upon the pistons is several times as large as that of a single piston, and accordingly can produce a larger output, through the piston rod, in the valve operating member constituting the valve section. Also, because a plurality of pistons are formed upon the outer periphery of the piston rod, a small-sized device can be provided without increasing the diameter of the device.

Furthermore, because the above-described valve actuator comprises the separate driving member disposed upon the pneumatic pressure introducing side and the valve operating member disposed upon the fluid passage side, the valve operating member which comes into contact with a clean fluid can be assembled after thorough washing. Since, in the assembling process, there is no necessity of connecting the introducing section of the piston rod to the valve operating member, it is possible to determine an accurate opening-closing stroke of the valve section by strictly manufacturing and assembling only such a limited member such as the valve operating member which is related to the opening-closing stroke of the valve section. Therefore, it is unnecessary to strictly manufacture and assemble all members for connecting together the piston rod and valve components as in conventional valve assemblies, thereby obtaining low-cost, uniform products.

Next, the operating conditions of a pneumatically-operated valve will be explained. In the normally-open pneumatically-operated valve, since the piston is biased in the direction away from the valve operating member and the valve operating member is forced to move toward the driving member side, the valve section is held in the open state without closing the passage. In this open state, when a part of the valve operating member is precisely formed such that the opening clearance defined between the valve section and the opening-closing section of the fluid passage is predeterminedly fixed, the installation of a metal diaphragm will enable an accurate valve opening and closing operation to be achieved even when the valve has an extremely short stroke. In addition when a VALVE CLOSE signal is sensed, pneumatic pressure will be applied to the piston against the spring biasing force, causing the piston to actuate the valve operating member through means of the driving member, and therefore the fluid passage will be closed from the normally open state by means of the valve section.

In the normally-closed pneumatically-operated valve, the valve operating member is biased by means of the spring force so as to move the piston toward a position closing the fluid passage, the fluid passage thus being disposed in the normally-closed state by means of the valve section. Precise manufacture and assembly of the valve operating member and a member upon which this valve operating member seats, so that, in this closed state, a fixed amount of opening clearance may be formed between the valve operating member and a surface upon which the valve operating member seats, enables accurate opening and closing of the valve by means of a metal diaphragm even when the valve section has a very short stroke. When the VALVE OPEN signal is sensed, pneumatic pressure is applied to the piston against the spring biasing force, overcoming the downward force exerted by means of the driving member upon the valve operating member; therefore, the valve operating member moves toward the driving member against its return spring force, opening the valve section from the normally closed position and accordingly switching the fluid passage from the normally closed state to an open state.

Referring now to FIG. 1, one example of a preferred embodiment of the normally-open pneumatically-operated valve of the present invention which is used in a normally open state will be explained. In this drawing, numeral (1) is a cylinder, which is hermetically sealed at the top end by means of a closing member (3) and an O-ring (2), this closing member (3) being fixed within cylinder (1) by means of a snap ring (4) disposed within the interior peripheral surface of the cylinder (1), and being covered with a cover member (5) fixed by bonding at the upper end thereof, and further being provided with an air inlet port (6) formed within a sidewall portion of the cylinder (1). Within the cylinder (1) a piston rod (7) is disposed, and upon the outer periphery of this piston rod (7) are fixed two pistons (10) and (11) with two O-rings (8) and (9) which slide in close contact with the inner wall of the cylinder (1). These pistons (10) and (11) are axially spaced from each other in an airtight manner by means of a separating wall (13) which is formed so as to project radially inwardly in an annular form from the interior peripheral surface of the cylinder (1), and the air inlet port (6) is connected to two inflow chambers (14) and (15) respectively formed between one surface of the two pistons (10) and (11) and the closing member (3) and separating wall (13). Air from port (6) is conducted into the upper inflow chamber (14) by means of axially extending grooves (12) formed within upper peripheral portions of the piston (10), and an annular space defined between the interior peripheral wall surface of cylinder (1) and an annularly recessed portion (10') defined within the external periphery of piston (10) between the two O-rings (8) and (9). In addition, the air flows through an axially extending introducing passage (16) which extends downwardly from the top end of the piston rod (7) and which is in fluidic communication with chamber (14) at the upper end thereof and a transversely disposed fluid passageway (7') at the bottom end thereof, the latter opening into inflow chamber (15). According to the embodiment shown in FIG. 1, the first inflow chamber (14) is formed in a space between the first piston (10) and the above-mentioned closing member (3), while in the second embodiment shown in FIG. 2, the inlet port (6) is in direct fluidic communication with inflow chamber (14), and the latter is in fluidic communication with the inflow chamber (15) by means of the axially extending introducing passageway (16) as well as upper and lower transversely extending fluid passageways (7'') and (7''') formed within piston rod (7);

The pistons (10) and (11) are each provided with two O-rings (8) and (9) disposed at an appropriate distance apart in the outer periphery as previously stated, in order to prevent their swaging within the cylinder (1). Within the vicinity of one of the O-rings (8) and (9) there is formed an inlet supply and exhaust groove (12), respectively, within the pistons (10) and (11) so as to supply and expel the air out of the space defined between the O-rings (8) and (9).

The cylinder (1) is rotatably connected and fixed at one end to a junction body (17) through means of a lock ring (18). Between the first piston (10) and the separating wall (13) is disposed a biasing spring (20). This biasing spring (20) thus causes the first and second pistons (10) and (11) to be moved upwardly within the first and second inflow chambers (14) and (15) respectively, as shown in the drawing, thereby normally keeping an engaging section (21) projecting downwardly from the bottom end of the piston rod (7) in engagement with an end (23) of an inner tube (22) projecting inwardly from the junction body (17). The air supplied from the air inlet port (6) flows through the introducing passage (16) formed within the piston rod (7), in the direction so as to bias the pistons (10) and (11) against the restoring force of the biasing spring (20), which tends to move the piston rod (7) upwardly. Into the junction body (17) a connecting member (25) having a control fluid passage (24) defined therein is threadedly engaged and fixed means of a threaded section (26). Within this connecting member (25) is inserted a valve operating member (27) which is movable separate from the piston rod (7).

This valve operating member (27) comprises a polygonal or double flattened member body (30) which has a torquing section (28) projecting outwardly from the outer periphery therefrom; and a retaining member (32) which is threadedly engaged and fixed through means of a threaded section (31) into the upper part of this member body (30). At the upper end of the retaining member (32) there is provided a retaining section (33) having a male thread; also between the retaining body (32) and the member body (30), a metal diaphragm (34) produced from a material such as stainless steel, and an engaging flange (35) are fixedly disposed, with the metal diaphragm (34) disposed upon the member body (30) side and the engaging flange (35) positioned upon the retaining member (32) side, in such a manner that the annular push section (36) of the member body (30) is pressed against the metal diaphragm (34). To this member body (30) facing the opening-closing section (37) of the passage (24), a valve section (38) which normally does not close the passage (24) is secured. This valve section (38) is formed thicker than required, therefore leaving extra machining stock, so as to permit cutting away an appropriate amount of stock; and after the completion of assembly of the abovementioned member body (30), the retaining member (32), the engaging flange (35) and the metal diaphragm (34), a jig (40) is fixedly secured by threadedly engaging the same with the retaining member (33) as shown in FIG. 3, and secured to a chuck (41) of a machine tool such as a lathe, such that an extraneous surface portion of the valve section (38) will be cut away, enabling extremely rigorous definition of a dimension (a) from the upper surface of the engaging flange (35) to the lower cut surface of the valve section (38) even if the size of each member described above is of low dimensional accuracy, and accordingly a high-accuracy valve operating member (27) is obtained through means of an easy machining process.

Next, the valve operating member (27) that has been removed from the jig (40) is of the following construction. An inner-peripheral projection (39) of an annular insert member (42) is positioned atop the upper surface of the engaging flange (35), a return spring (44) is positioned upon the upper surface of the inner-peripheral projection (39), and also an annular flange (43) is secured to the retaining section (33). Thus the valve operating member (27) is biased toward the piston rod (7). Furthermore, as described above, the piston (10), (11) side and the passage (24) side of the valve assembly are separated from each other in a liquid-tight manner by means of the intervening metal diaphragm (34), thus protecting the clean control object fluid flowing within the passage (24) from being contaminated due to its contact with the piston rod (7) side members. The mounting of this metal diaphragm (34) strictly limits the movable stroke of the valve operating member (27) to approximately 0.5 mm in one embodiment. And in the state that the valve section (38) fixed to the valve operating member (27) has opened the opening-closing section (37) of the passage (24), the engaging flange (35) of the valve operating member (27) and the insert member (42) are forced into end-to-end contact with each other by means of the restoring force of the return spring (44).

The pneumatically-operated valve of the above-described construction is assembled as follows. First wash each member on the piston rod (7) side and each member of the valve operating member (27) separately. The valve operating member (27) which comes into direct contact with a clean fluid and the connecting member (25) should be washed particularly thoroughly. Also each member on the piston rod (7) side should be washed properly so as not to injure the O-rings (2), (8) and (9) in use. The piston rod (7) and the valve operating member (27) that have been cleaned are assembled together with other members of the respective sides so as not to contact with each other. This assembly operation is performed without connecting the piston rod (7) with the valve operating member (27) and therefore can be done with ease, and engaging and securing operations can be accomplished by the use of a clean automatic machine, thereby enabling little contact of each member constituting the piston rod (7) with the valve operating member (27) during assembling so as to prevent any dust contamination thereof. Furthermore, it is possible to assemble the valve operating member (27), which requires a high degree of cleanliness, in a clean room and to assemble each member on the piston rod side (7) in an ordinary room, allowing proper use of economical assembling operation.

The mounting of the metal diaphragm (34) reduces the movable stroke so that the same is very short, approximately 0.5 mm, in one embodiment. However, since the piston rod (7) and the valve operating member (27) are separately formed, the stroke movement will not be influenced by the size of the members, such as the piston rod (7) and the pistons (10) and (11). Moreover, as regards the size of the members, since the strictly machined size of the valve operating member (27) can be maintained by cutting the valve section (38) after assembling as previously stated, there can be formed an accurate opening clearance (47) formed between the valve section (38) and the opening-closing section (37) by manufacturing and assembling the rising section (46) of the connecting member (25) and the insert member (42) to an accurate size. Thus it is possible to save labor required for rigorous manufacture and assembly of all of the members as in conventional products, to improve the reliability of the products, to prevent problems wherein the valve section (38) can not be operated because of absorption of the movement stroke corresponding to the opening clearance (47) as in conventional products, and to accurately achieve the operation of the valve section (38) having a very short movement stroke of approximately 0.5 mm.

The operation of the pneumatically-operated valve which is constructed as described above will be explained. Referring FIG. 1, normally the piston rod (7) will not engage the valve operating member (27) with a biasing force applied t· the pistons (10) and (11) by means of the biasing spring (20), and therefore the valve operating member (27) normally holds the valve section (38) in an open state under the influence of the restoring force of the return spring (44). When a CLOSE signal is sensed, the air from the air inlet port (6) open to the cylinder (1) flows into the two inflow chambers (14) and (15) defined above the two pistons (10) and (11) respectively, applying pneumatic pressure to the two pistons (10) and (11). Accordingly, the active pressure area of the pistons (10) and (11) will result in a transmission force which is approximately twice as large as that of a single piston, allowing the transmission of a larger output to the valve operating member (27) from the end section (45) having a curved surface. Therefore, the pneumatic pressure biases the valve operating member (27) against the restoring force of the return spring (44), thereby easily closing the opening-closing section (37) of the passage (24) by means of the valve section (38) even when a high-pressure fluid flows within the passage (24).

Figure 2:
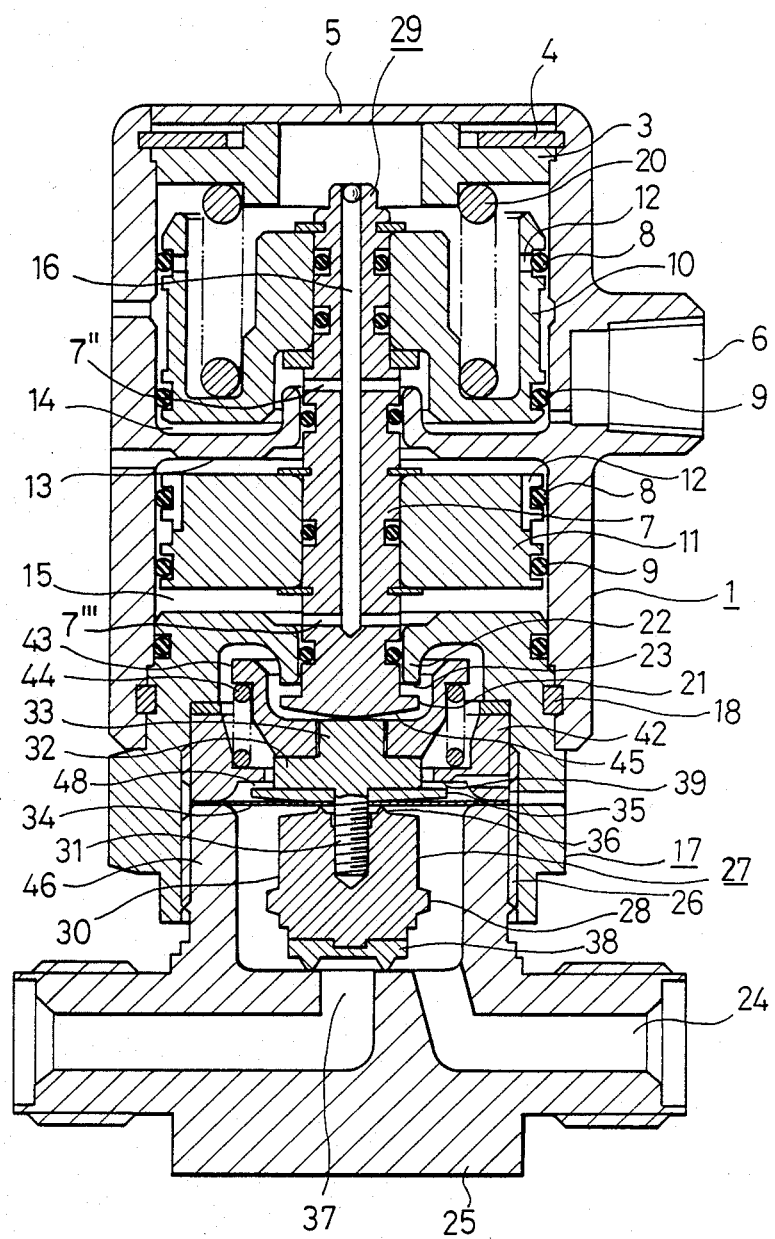
FIG. 2 is a sectional view of a normally-closed pneumatically-operated valve constructed in accordance with the present invention.

In the embodiment given above, an example using the present invention as a normally-open pneumatically-operated valve has been described. When the present invention is used as a normally-closed pneumatically-operated valve, as shown in FIG. 2, the push spring (20) is interposed between the piston (10) and the closing member (3) such that the valve operating member (27) will be biased by means of the lower end (45) of the piston rod (7) toward the closed position with respect to the passage (24), thus disposing the opening-closing section (37) of the passage (24) in a normally closed state by means of the valve section (38). In this closed state, if an opening clearance (48) to be formed between the engaging flange (35) of the valve operating member (27) and the insert member (42) is in fact precisely formed, a reliable opening-closing valve can be provided by installing the metal diaphragm (34) as shown even when the movement stroke of the valve section (38) is extremely short. And when an OPEN signal is sensed, the pressure force normally applied by means of the piston rod (7) to the valve operating member (27) is released by means of the pneumatic pressure applied to the pistons (10) and (11) against the operating force of the biasing spring (20); and therefore the valve operating member (27) is moved toward the piston rod (7) by means of the exerting force of the return spring (44), thus opening the valve section (38) with respect to the opening-closing section (37) and opening the fluid passage (24) from the normally-closed state.

Since the present invention is so constituted as described above, the inflow of air into a plurality of inflow air chambers formed within the cylinder from the air inlet port open to the interior of the cylinder exerts pneumatic pressure upon the plurality of pistons; the active pressure area of the pistons is several times as large as that of a single piston, and accordingly can produce a larger output, through means of the piston rod, in the mechanism to be operated. Also, since a plurality of pistons are formed upon the outer periphery of the piston rod, a small-sized device can be provided without increasing the diameter of the device.

Furthermore, the valve actuator is formed of two separate parts: a driving member and a valve operating member, and soft substances such as O-rings likely to be impaired by means of ultrasonic cleaning are attached only within the former, and are not used within the latter so as not to be in contact with the clean fluid. Therefore, the valve operating member which contacts the clean fluid can be thoroughly cleaned by separately washing the driving member and the valve operating member during manufacture, thus insuring cleaning without contaminating the clean cleaning solution, facilitating the assembling operation by reducing the likelihood of contact of an operator with the members during the assembling operation, preventing the possibility of attachment of dust during the assembling operation, and enabling the assembling operation to be conducted by means of a clean automatic machine.

Furthermore, even though the valve section has a very short movable stroke due to the particular mounting of the metal diaphragm, since the driving member and the valve operating member are formed separately, the opening clearance between the valve section and the opening-closing section can be accurately formed without being influenced by means of inevitable dimensional variations in many of the members, such as, for example, the driving member, pistons, and lock rings as in conventional products, if the specified limited dimensions of the members constituting the valve operating member and a small number of members which the valve operating member contacts are strictly manufactured and assembled, thus obtaining low-cost, highly reliable products.

Obviously, many modifications and variations of the present invention are possible in light of the above teachings. It is therefore to be understood that within the scope of the appended claims, the present invention may be practiced otherwise than as specifically described herein.

What is claimed is:

1. A pneumatically-operated valve for controlling the flow of fluid through a fluid passageway by movement of said valve between a normally open position and a closed position with respect to a valve seat defined upon said fluid passageway, comprising:

valve means, disposed within the vicinity of said fluid passageway and spring-biased to said normally open position, for controlling said flow of fluid through said fluid passageway;

a cylinder having a longitudinal axis defined therein;

a transversely extending annular partition plate disposed within said cylinder for dividing said cylinder into first and second piston chambers;

an axially disposed piston rod movable within said cylinder between first inoperative and second operative positions, and extending through said annular partition plate so as to have opposite end portions thereof disposed within said first and second piston chambers;

first piston means fixedly secured upon one end of said piston rod and disposed within said first piston chamber;

second piston means fixedly secured upon an axially central portion of said piston rod and disposed within said second piston chamber, a second end portion of said piston rod being disposed within the vicinity of said valve means for engaging said valve means and moving said valve means from said normally open position to said closed position when said piston rod is moved from said first inoperative position to said second operative position;

spring biasing means, disposed within said first piston chamber and interposed between said annular partition plate and said first piston means, for normally biasing said piston rod to said first inoperative position;

inlet port means defined within a sidewall portion of said cylinder for introducing pressurized fluid into said first piston chamber in order to move said piston rod from said first inoperative position to said second operative position;

axially extending fluid passageway means defined within an external surface portion of said first piston means for fluidically connecting said inlet port means to said first piston chamber;

axially extending fluid passageway means defined within said piston rod from said one end of said piston rod to said axially central portion of said piston rod for providing fluidic communication from said first piston chamber toward said second piston chamber; and transversely extending fluid passageway means defined within said axially central portion of said piston rod for providing fluidic communication between said axially extending fluid passageway means of said piston rod and said second piston chamber.

2. A valve as set forth in claim 1, further comprising:
axially spaced O-ring sealing means mounted upon peripheral portions of said first piston means and engaging interior wall portions of said first piston chamber defined within said cylinder; and
radially recessed annular means defined within a peripheral portion of said first piston means between said O-ring sealing means for fluidically communicating said inlet port means with said axially extending fluid passageway means defined within said first piston means so as to fluidically connect said inlet port means to said first piston chamber.

3. A valve as set forth in claim 1, wherein:
said first piston means has an annular recessed portion for housing one end of said spring biasing means.

4. A valve as set forth in claim 1, further comprising:
means for closing a first end of said cylinder within which said first piston chamber is defined;
housing means, closing a second end of said cylinder within which said second piston chamber is defined, for housing said valve means and a portion of said fluid passageway;
first flange means defined upon said housing means; and
second flange means defined upon a second end of said piston rod for engagement with said first flange means of said housing means for limiting the movement of said piston rod with respect to said cylinder during movement of said piston rod to said first inoperative position.

5. A valve as set forth in claim 4, further comprising:
third flange means defined upon said housing means; and
fourth flange means defined upon said valve means for engagement with said third flange means of said housing means for limiting the movement of said valve means with respect to said valve seat during movement of said valve means to said normally open position.

6. A valve as set forth in claim 5, further comprising:
fifth flange means defined upon an end portion of said valve means which is disposed opposite an end portion of said valve means which is engageable with said valve seat of said fluid passageway; and
spring-biasing means, interposed between said third flange means of said housing means and said fifth flange means of said valve means, for biasing said valve means toward said normally open position.

7. A valve as set forth in claim 4, further comprising:
diaphragm means, interposed between said housing means and said portion of said fluid passageway and mounted upon said valve means, for isolating said first and second piston means, and said piston rod, from said fluid flowing through said fluid passageway.

8. A valve as set forth in claim 1, wherein:
said second end portion of said piston rod which is engageable with said valve means has an arcuate configuration as seen in cross-section.

9. A valve as set forth in claim 1, wherein:
said longitudinal axis of said cylinder is disposed substantially vertically; and
said fluid passageway is disposed substantially horizontally.

10. A valve as set forth in claim 6, wherein:
said spring-biasing means for biasing said piston rod, and said spring-biasing means for biasing said valve means, comprise coil springs.

11. A valve as set forth in claim 4, further comprising:
lock ring means for securing said housing means and said cylinder together.

* * * * *